Sept. 27, 1960 G. ALFANO 2,954,194
GUIDE AND HOLDER FOR FLAT, PERFORATED GARDEN HOSE
Filed April 1, 1960
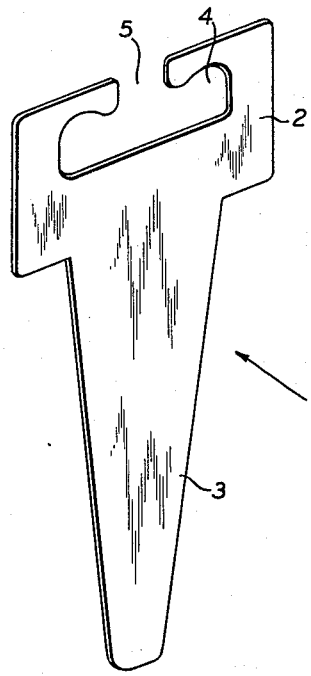
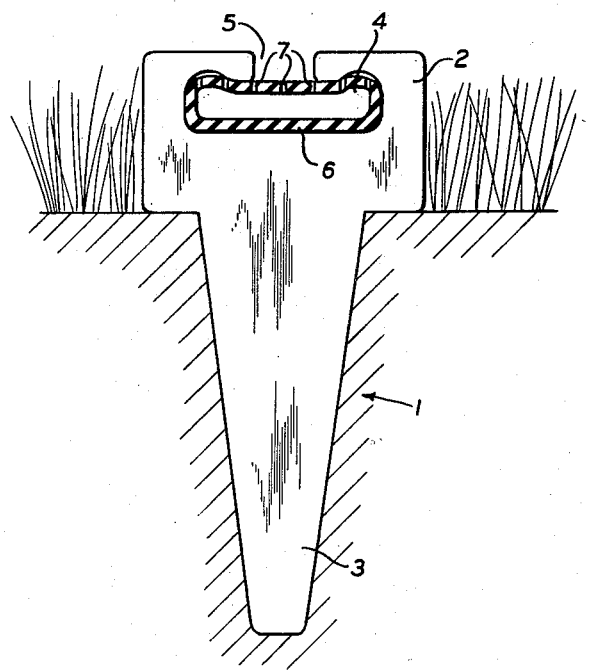
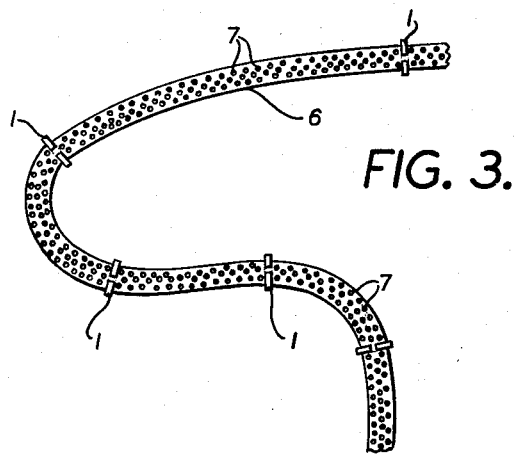
INVENTOR
GUSTAVE ALFANO
ATTORNEY.

United States Patent Office 2,954,194
Patented Sept. 27, 1960

2,954,194
GUIDE AND HOLDER FOR FLAT, PERFORATED GARDEN HOSE

Gustave Alfano, 25—57 Steinway St.,
Long Island City 3, N.Y.

Filed Apr. 1, 1960, Ser. No. 19,283

4 Claims. (Cl. 248—75)

The present invention relates to a guide and holder for a flat, perforated garden hose, and in particular to such garden hose which provides a spray throughout its entire length.

It is known that in using perforated garden hoses in order to spray water on a predetermined portion of a garden throughout the entire length of such hose, it is necessary to lay out the hose according to a predetermined pattern. It has been experienced, however, that due to the water pressure in the hose, there is a forced and undesirable movement of the hose from the laid-out position, whereby portions of a garden are sprayed where such spray is not required, while other portions do not get the required water spray.

It has been proposed before to provide holders for the sprinkler head of the garden hose mainly for the purpose to direct the spray emerging from the end of the hose in substantially any desired direction. The present invention is not concerned with a holder for the sprinkler head, rather with means for retaining a perforated hose in any predetermined position laid out in a garden according to the specific requirements, which lay-out may comprise straight as well as curved portions.

It is, therefore, one object of the present invention to provide a guide and holder for perforated garden hose which is economical in its manufacture, is easily insertable into the ground or the lawn and is capable of retaining the perforated hose in any laid out position.

It is another object of the present invention to provide a guide and holder for perforated garden hose which comprises a flat, longitudinal body to be inserted into the ground or the lawn, which body has on its upper end a crosswise disposed slot which opens upwardly for a part of its length in order to permit the insertion of the hose into the slot which is then retained in the slot on the spot of the lawn where said guide and holder has been inserted.

With these and other objects in view, which will become apparent in the following detailed description, the present invention will be clearly understood in connection with the accompanying drawing, in which:

Figure 1 is a perspective front view of the guide and holder for perforated garden hose designed in accordance with the present invention;

Fig. 2 is a front elevation of the guide and holder as shown in Fig. 1, indicating the inserted hose and the guide and holder shown inserted into the ground; and Fig. 3 is a top plan view of a portion of a perforated garden hose indicating a lay-out design for such hose with a plurality of guides to retain the perforated garden hose in its predetermined position.

Referring now to the drawing, the guide and holder for the perforated garden hose comprises a flat, longitudinal body 1, preferably made of sheet metal, particularly of aluminum or a similar alloy which is stainless and since it is of thin sheet metal, it lends itself for easy insertion into the soil of a lawn.

The flat body 1 comprises a preferably rectangular upper portion 2 which has integrally connected thereto a substantially triangular bottom portion 3 tapered downwardly to terminate at its lower end nearly to a point. This tapered arrangement is provided in order to simplify the insertion of the guide into the soil. The rectangular upper portion 2 is preferably wider than the uppermost part of the bottom portion 3.

The rectangular portion 2 has a crosswise disposed and normally horizontally extending slot 4, which slot 4 opens towards the upper margin of the guide 1 by means of the opening 5.

The lower edge of the slot 4 is substantially straight and horizontal, while the two upper edges of the slot 4 disposed on both sides of the opening 5 have preferably an upwardly curved portion, which serves the purpose to force the inserted hose, when under water pressure, with its upper walls of the flat hose into the curved edge portions, so that an undesirable removal of the hose from the slot of the flat body 1 is impossible.

As clearly shown in Fig. 2, the flat hose 6 is inserted into the slot 4 through the opening 5 in such a manner that the perforations 7 are disposed in the upper layer of the hose 6 and upon insertion of the latter into the slot 4, particularly upon putting water pressure into the hose, the hose will engage closely the inner edges of the slot 4.

In order to provide proper water spraying in any garden or lawn, the perforated hose 6 is laid out in accordance with a predetermined design as indicated by example in Fig. 3. A guide 1 is inserted into the ground at any place, particularly at those places where the hose is supposed to follow a curved line, in order to retain the hose 6 in such a curved position and to cover the area or areas intended to be sprayed by the hose.

In order to provide limiting means for the depth of insertion of the body 1 into the soil, the width of the upper portion 2 is greater than that of the lower portion 3, so that the lower lateral edge portions of the upper portions 2 stop the extension of insertion of the body 1.

While I have disclosed one embodiment of the present invention, it is to be understood that this embodiment is given by example only and not in a limiting sense, the scope of the present invention being determined by the objects and the claims.

I claim:

1. A guide and holder for a perforated garden hose comprising a flat, longitudinal body having an upper portion and a lower portion, said upper portion defining a crosswise disposed slot opening towards the upper edge of said body and adapted to have a perforated hose extend therethrough, and said lower portion tapering down in downward direction to ease the insertion of said body into soil.

2. The guide and holder, as set forth in claim 1, wherein the upper edge portions of said slot are upwardly concavely curved in order to retain said garden hose in said slot.

3. The guide and holder, as set forth in claim 1, wherein said upper portion is of a width greater than that of said lower portion, so that the lower edges of said upper portion operate as limiting means for the insertion of said body into the soil.

4. A guide and holder for a perforated garden hose comprising a flat, longitudinal body having an upper, substantially rectangular portion and a lower, substantially triangular portion, said upper portion being of a width greater than that of said lower portion, said upper portion defining a crosswise disposed slot opening towards the upper edge of said body and adapted to have a perforated hose extending therethrough, and said lower portion tapering down in downward direction to ease the insertion of said body into soil.

References Cited in the file of this patent

UNITED STATES PATENTS

| | | |
|---|---|---|
| 2,463,147 | Bumbaugh | Mar. 1, 1949 |
| 2,757,962 | MacLeod | Aug. 7, 1956 |